United States Patent [19]

Ehmke et al.

[11] 4,367,848

[45] Jan. 11, 1983

[54] SPREADER

[75] Inventors: Richard J. Ehmke; Arthur Linsenmeyer, both of Beatrice, Nebr.

[73] Assignee: Dempster Industries, Inc., Beatrice, Nebr.

[21] Appl. No.: 290,946

[22] Filed: Aug. 7, 1981

[51] Int. Cl.³ .............................................. A01C 17/00
[52] U.S. Cl. .................... 239/665; 239/676; 193/32
[58] Field of Search .............. 239/665, 666, 676, 672; 414/301; 193/32, 2 R, 2 D

[56] References Cited

U.S. PATENT DOCUMENTS

| | | | |
|---|---|---|---|
| 1,008,684 | 11/1911 | White | 193/32 |
| 1,383,281 | 7/1921 | Bailey | 193/32 |
| 2,856,191 | 10/1958 | Kolb | 239/665 |
| 3,232,626 | 2/1966 | Polzin | 239/665 |
| 3,559,894 | 2/1971 | Murray et al. | 239/672 |

*Primary Examiner*—John J. Love
*Assistant Examiner*—J. Rastello
*Attorney, Agent, or Firm*—Hugh D. Jaeger

[57] ABSTRACT

Adjustable vane rear chute for use with a dry material spreader including an inversely mounted rear chute with respect to a spinner disc, the rear chute including a plurality of adjustable vanes with respect to a central axis of the spinner disc. The adjustable vanes include a left vane and a right vane connected to a left handle and a right handle rod which are rotatably positioned about the base of the chute providing for predetermined spread of material. The rotational orientation function of the adjustable vane rear chute is a function of the conveyor drive shaft rpm, the cubic feet of material discharge per conveyor drive shaft revolution per inch of feedgate opening, and feedgate opening. The adjustable vane rear chute includes at least one adjustable vane and in this instance two adjustable vanes which are rotatably adjustable for each vane over a plurality of predetermined points, resulting in a correct pattern distribution of spread material.

10 Claims, 6 Drawing Figures

SPREADER

BACKGROUND OF THE INVENTION

1. Field of the Invention

The present invention pertains to dry material spreaders and, more particularly, pertains to an adjustable vane rear chute being reverse mounted with respect to material flow for achieving predetermined distribution of dry material.

2. Description of the Prior Art

Prior art spreaders incorporating conical spinners and chutes for guiding the material to the conical spinners from the conveyor chain have failed to adequately provide for predetermined, even and equal distribution of the material over a predetermined area. Prior art spreaders usually deposited the material with a relatively narrow band or an uneven band with little regard to the distribution pattern and the density of the material spread over that distribution pattern. Due to the cost of the dry material being spread, such as fertilizer, and the importance of even distribution, the prior art spreaders have been less than satisfactory. This is especially important when fertilizing crops with dry material such as corn or other similar cash crops.

Prior art spreaders have failed to allow for any adjustability of the chute about the spinner center line, let alone any rotational adjustability. The prior art chutes have failed to allow for precise adjustment of the spread patterns or for precise adjustment of the spread patterns to obtain uniformity and equalize distribution of the material.

The present invention overcomes the deficiencies of the prior art by providing an adjustable, discrete positioning of the adjustable vane rear chute for obtaining uniform and equalized pattern distribution of dry material spread from the spreader.

SUMMARY OF THE INVENTION

The general purpose of the present invention is a mechanically adjustable chute being rear mounted and having at least one—and two in this disclosure—adjustable vanes coupled with a conical spinner providing for a predetermined degree of pattern control of distribution of dry material such as fertilizer. The adjustable vane rear chute includes a plurality of fixed positioned vanes which control the distribution of the material.

According to one embodiment of the present invention, there is provided an adjustable vane rear chute for use with a dry material spreader including a hopper, chassis supporting the hopper, plurality of tires supporting the chassis, an adjustable gate positioned on the rear of the hopper, a conveyor chain running the longitudinal length through a lower portion of the conveyor, a conveyor sprocket and gearbox coupled to a drive mechanism, a spinner disc including a conical member having a central axis and spinner vanes positioned about the conical member of the spinner connected to the gearbox, a deflector positioned behind the spinner, and an adjustable vane rear chute including at least one and preferably two axially mounted vanes, a vane positioned, axially rotatable and substantially parallel to each side inward of a U-shaped member of the rear chute, each of the vanes connected to a handle rod and secured to the sides of the chute with an ear, and a plurality of holes provided on a geometrical arc with respect to each side of the chute and pins positioned in each of the rods for engaging within each of the holes whereby patterned distribution of dry material spread by the spreader through interaction of the conveyor chain spinner disc deflection is controlled by predetermined positioning of each of the vanes through the pins of each handle rod engaging in one of the plurality of holes on each geometrical arc, thereby providing for predetermined and equalized pattern distribution of dry material from the adjustable rear chute with discrete fixed position vanes.

The adjustable vane rear chute bolts on to the rear side support members for the rear conveyor sprocket and is fixedly secured thereto.

A significant aspect and feature of the present invention is to provide an adjustable vane rear chute having at least one, and preferably two adjustable vanes provided for predetermining positioning about a central axis of a conical member of a spinner disc of a dry material spreader. The chute rotational orientation function is a function of the conveyor drive shaft rpm, the cubic feet of material discharged per conveyor drive shaft revolution per inch of feedgate opening and feedgate opening.

Another significant aspect and feature of the present invention is to provide adjustable vanes on a rear inversely mounted chute which are adjustable in the field simply by hand positioning of a rod into engagement of a rod carried pin with a hole on the base of the chute. While positioning could be electromechanical, it is easily accomplished by ordinary hand movements requiring no tools or complex computer mathematical computations. Adjustability is simply a function of knowing the material, and after correlating the type of material, engaging a pin of each handle rod of the vanes into a numbered slot on the base of the chute. The spread pattern of the material is a function of the angle of each of the adjustable vanes of the inversely mounted rear chute which can be related and correlated to any type of material.

DESCRIPTION OF THE PREFERRED EMBODIMENTS

Figure 1:
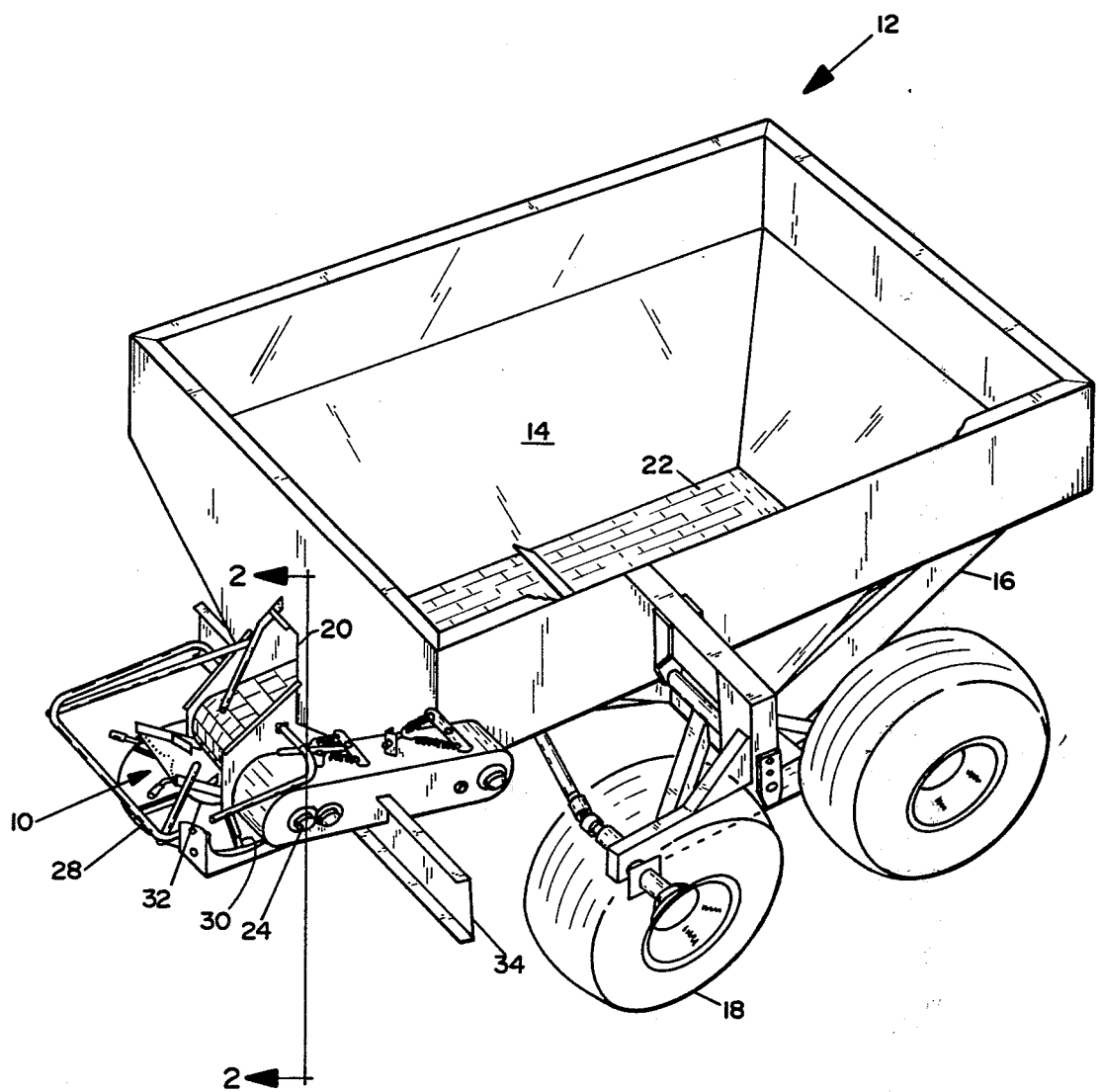
FIG. 1 illustrates a perspective view of an adjustable vane rear chute, the present invention, positioned on a dry material spreader.

FIG. 1, which illustrates a perspective view of an adjustable vane rear chute 10, the present invention, shows the chute 10 positioned inversely and rearwardly mounted on a dry material spreader 12. The dry material spreader 12 includes a hopper 14, the hopper 14 positioned on a chassis 16, the chassis 16 supporting a plurality of high flotation tires 18. The hopper 14 includes an adjustable feedgate 20, a conveyor chain 22 running rearwardly along a lower narrow width portion of the hopper 14, a conveyor sprocket assembly 24 driving the chain which can be powered either from the wheel assemblies or from the vehicle pulling the spreader 12, and a gearbox 26 illustrated in FIG. 2. A spinner disc 28 including a plurality of spinner vanes 30 mounted about a conical spinner 32 provide for distribution of material from the spinner vanes 30 by way of the adjustable vane rear chute 10. The deflector 34 deflects the material accordingly for the spread pattern which is spread by the spinner disc 28. The adjustable vane rear chute 10 is now described in greater detail below.

Figure 2:
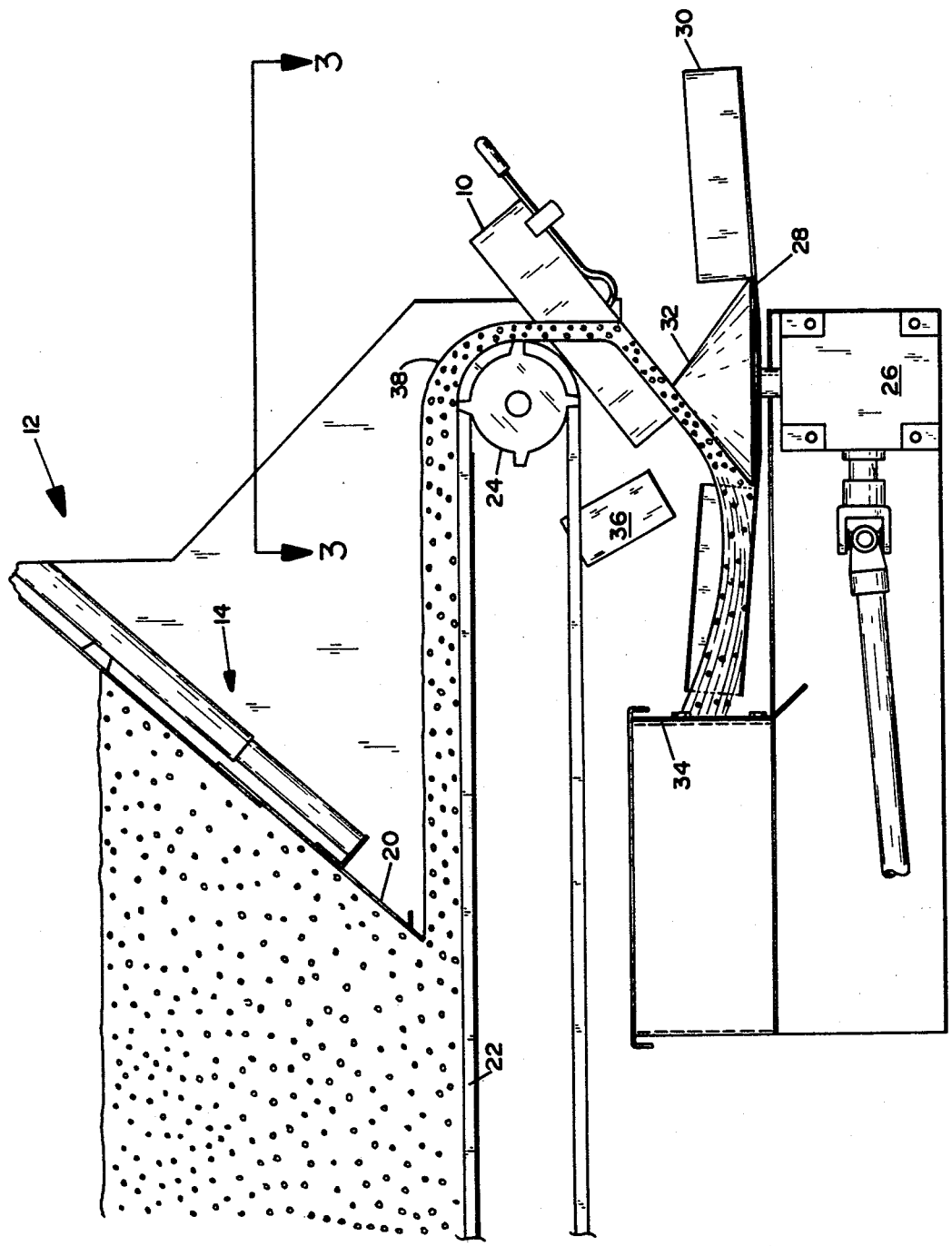
FIG. 2 illustrates a side view taken along line 2—2 of FIG. 1.

FIG. 2, taken along line 2—2 of FIG. 1, shows a side view of the adjustable vane rear chute 10 and the dry material spreader 12. The figure particularly shows a front chute 36 for channeling of any material falling forward of sprocket 24 through the conveyor chain 22 into the spinner disc 28 and any stray material which may result therefrom. All other numerals correspond to those elements previously described.

The path of dry material 38 is also particularly pointed out for purposes of illustration only and not to be construed as limiting of the present invention.

Figure 3:
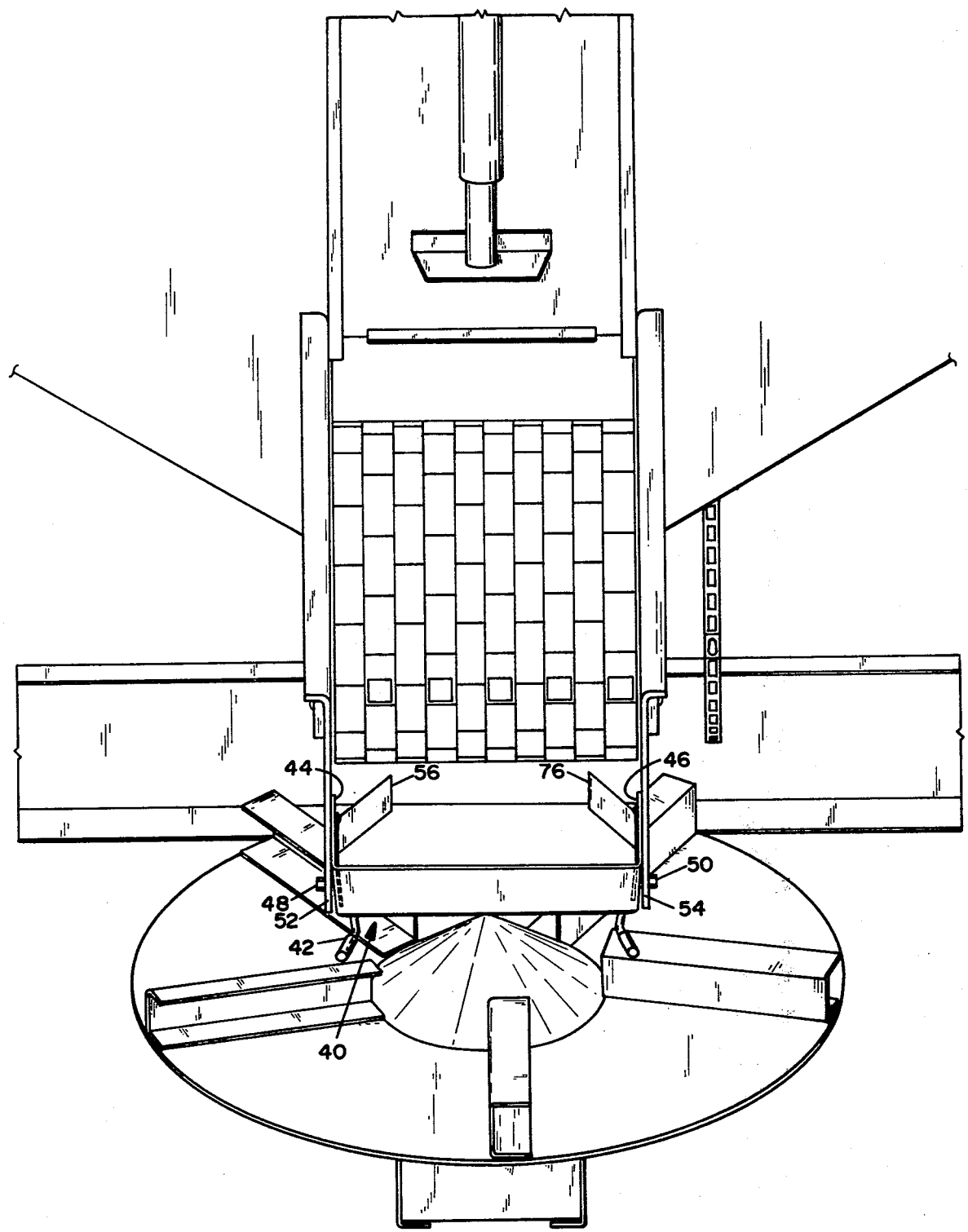
FIG. 3 illustrates a top view taken along line 3—3 of FIG. 2.

FIG. 3, which illustrates a view taken along line 3—3 of FIG. 2, shows the adjustable vane rear chute 10 in particular detail. The adjustable chute includes a generally U-shaped member 40 including a base 42, a left side 44 and a right side 46. Bolts 48 and 50 secure the left side and right side to ends 52 and 54 of the conveyor sprocket supports. The adjustable vane rear chute 10 includes a left adjustable vane 56 and a right adjustable vane 76 as now described in detail.

Figure 4:
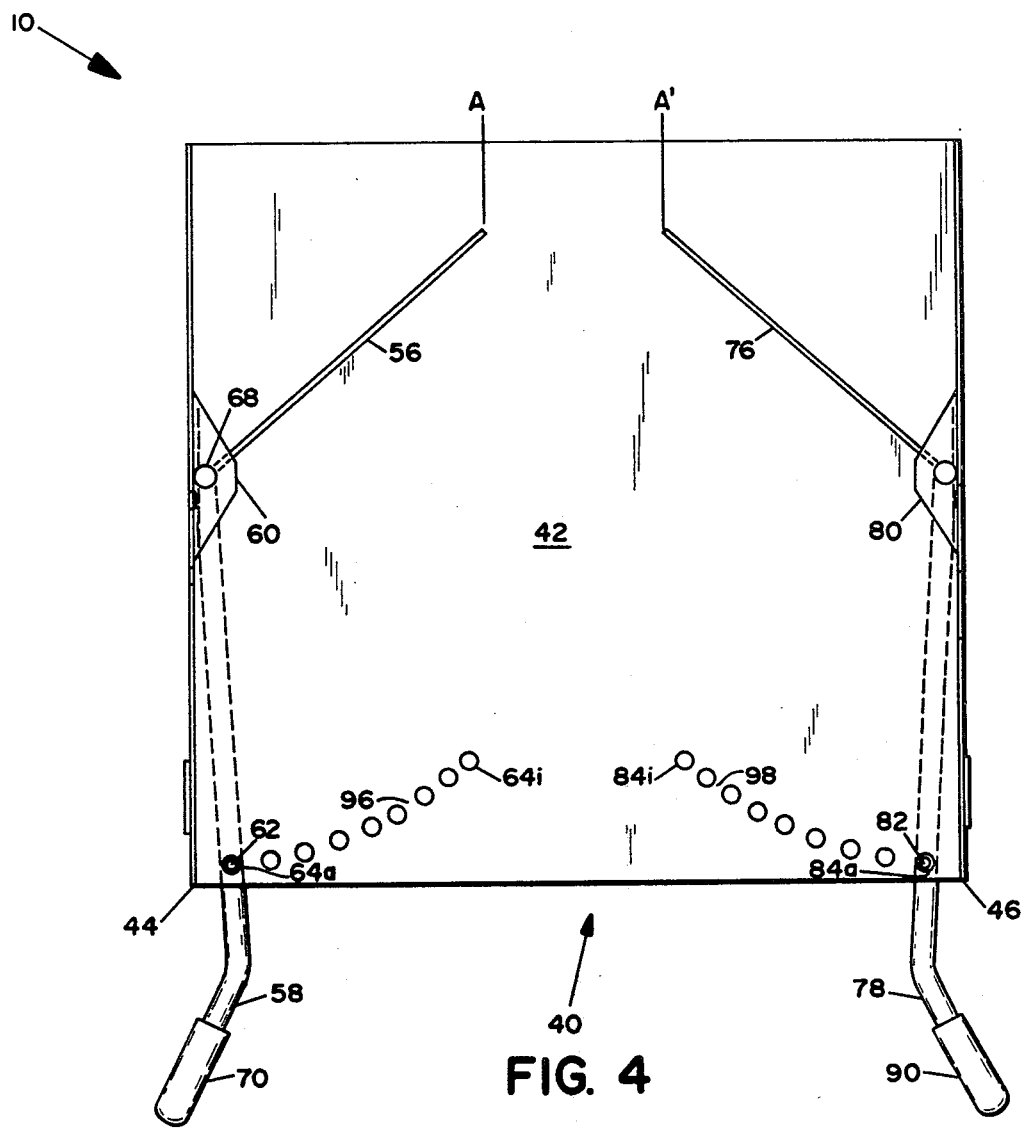
FIG. 4 illustrates a top view of the adjustable vane rear chute, the present invention.
Figure 5:
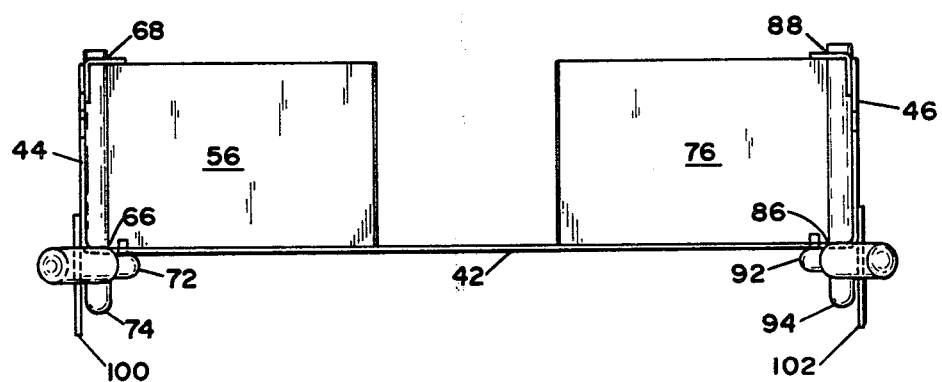
FIG. 5 illustrates an end view of FIG. 4.
Figure 6:
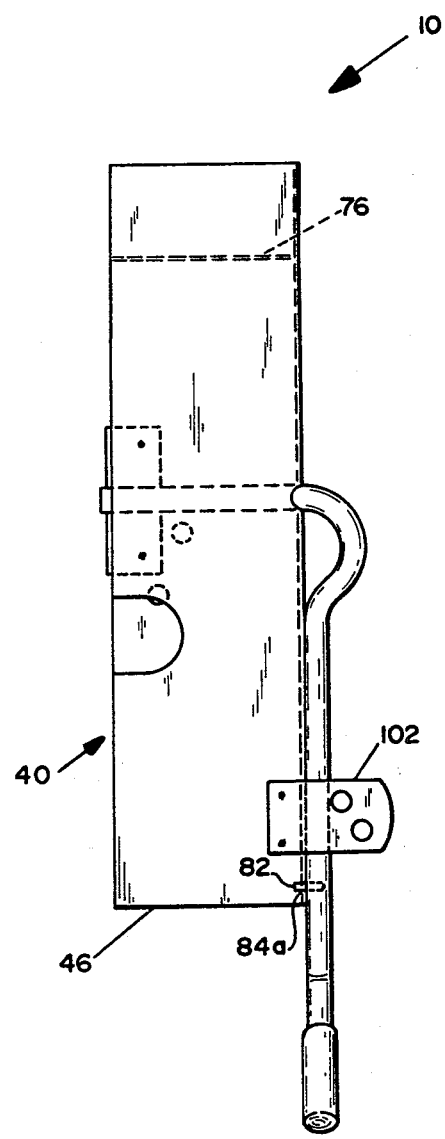
FIG. 6 illustrates a side view of the present invention.

FIG. 4, which illustrates a top view of the adjustable vane rear chute 10, shows the U-shaped member 40 including the base 42, the left side 44, the right side 46, and the left vane 56 and right vane 76. The rotatable structure of the left vane 56 is now described in detail. Left vane 56 connects onto a geometrically configured left handle rod 58 to an upwardly extending member of the rod and suitably welding the left vane 56 to the upward, axially extending member of the left handle rod 58. The vane 56 engages between a left ear 60 and the base 42 where the axially extending member of the rod 58 axially engages between a hole 66 in the base 42 and a hole 68 in the left ear. The left handle rod 58 extends rearwardly substantially parallel to the base 42 and includes a pin 62 positioned within the portion of the base and extending upwardly toward said base. A plurality of holes 64a through 64i extending in a geometrical arc provide for positioning of the pin 62 and likewise positioning of the left vane 56 which follows thereon. A suitable plastic handle 70 engages over the end of the left handle rod 58. The left handle rod 58 is uniquely geometrically configured as shown in FIGS. 4, 5 and 6 having a horizontal curved section 72 illustrated in FIG. 5 as well as a vertical section 74 illustrated in FIG. 6. The right vane 76 is a mirror image to that of the left vane 56 and includes identical members having rod 78, ear 80, pin 82, pluralities of holes 84 on a geometrical arc 98 opposing arc 96 base hole 86 and ear hole 88 plastic handle 90 covering rod 78.

FIG. 5, which illustrates an end view of the adjustable vane rear chute 10, shows numerals which correspond to those elements previously described. Particularly, the end configuration of the rods 58 and 78 are illustrated showing both the horizontal curves 72 and 92 and vertical curves 74 and 94 of the rods. Lock tabs 100 and 102 mount on the left side and the right side 44 and 46 respectively for securing the chute 10 to the conveyor sprocket supports 52 and 54.

FIG. 6, which illustrates an side view of the adjustable vane rear chute, shows numerals which correspond to those elements previously described. The figure particularly shows the engagement of the pin 82 into one of the plurality of holes 84a–84i for adjustment of the vane 76 with respect to the right side 46 of the U-shaped member 40 of the chute 10. The positioning of the lock tab 102 is also illustrated which is fixedly secured such as by spot welding to the side 46. The settings of the vanes for a particular number must maintain gap which is the normal optimum for operation. The constant gap is set between point A and A' with settings such as "1", "3", "8", etc., by way of example and for purposes of illustration only and departures from the normal optimum can be made if a particular material and rate requires the setting.

PREFERRED MODE OF OPERATION

The adjustable vane rear chute 10 on the dry material spreader 12 is implemented in operation by the predetermined adjustment of the vanes 56 and 76 which axially are positioned by the accompanying handles 58 and 78. Depending upon the predetermined geometrical pattern to be obtained, the vanes are suitably positioned to predetermined points where the pins 62 and 82 engage in the plurality of holes 64a–i and 84a–i. The predetermined positioning points can be based on manufacturer recommendations for the material or on the spreader manufacturer's recommendations for the material.

The spinner functions in terms of volume per unit of time. The chute rotational orientation, FC, function can be expressed as $$FC = (CRPM)(CFR)(G)$$

where CRPM equals conveyor drive shaft rpm, CFR equals cubic feet of material discharged per conveyor drive shaft revolutions at a one-inch feedgate opening, and G equals feedgate opening in inches.

The spinner with a cone centrally mounted provides for discharge of material from the conveyor belt falling into the chute and subsequently flowing over the cone to the spinner blades as directed by the axially adjustable vanes of the chute 10. The control of the vanes is structurally inherent by the axial positioning of the rods of the chute 10. The axial lateral movement of the vanes 56 and 76 provides directional control for optimized and equalized pattern distribution of the material. An equalized bell curve is obtained with the vanes retarded 4.7° with respect to center, providing for total discharge per degree of rotation for types of dry material by way of example and for purposes of illustration only and is not construed to be limiting of the present invention.

The adjustable fixed position vanes 56 and 76 can be advanced or retarded 15° either side of the conical spinner of the spinner disc of the material to be spread and the width of the desired and predetermined swath path. The material can be either fertilizer, salt, or other like material. The swath path can be either behind or to either side of the dry material hopper.

The adjustable fixed vanes 56 and 76 provide for correct pattern distribution of the dry material. The chute coupled with the conical spinner provides the degree of predictable pattern control for a known material resulting in predetermined spread pattern. The orientation adjustment of the vanes 56 and 76 provide for the material to fall in a crescent shaped pattern on the conical spinner for equalized pattern distribution. The material flow relative to the spinner center line in the chute of the U-shaped member is effectively controlled by the vanes 56 and 76.

Attention is pointed to the vane 56 illustrated in dashed lines in a position corresponding to placement of the pin 62 in hole 64i and illustrating the angular swing of the vane 56 which is likewise to that in mirror image of vane 76. The "5" corresponds to the mid-point position of the vane 56 when the pin 62 is in the hole 64i. While the range of 15° has been utilized for advancement or retardation of the vanes, this is by way of example only and for purpose of illustration and not to be construed as limiting of the present invention.

Various modifications of the present invention can be made without departing from the apparent scope thereof.

Having thus described the present invention, what is claimed is:

1. Adjustable vane rear chute for use with a spinner disc including a conical spinner axially driven behind and below of feedgate and longitudinal conveyor chain running longitudinally of a geometrically configured hopper of a dry material spreader, said chute comprising;
   a. configured means including a base, left side and right side members affixed to said base, two opposing holes in said base, and two pluralities of holes positioned in a rearward portion of said base on opposing geometrical arcs;
   b. two geometrically configured handle rods, each rod including a vertical axial member extending up through each of said opposing holes and including means in a rearward horizontal portion for engaging into one of said holes of each of said geometrical arc;
   c. longitudinal directional control vanes affixed to each of said axial member for positioning at an angle with respect to an end of said chute for directing dry material coming down thereto to a precise position over said conical spinner of said spinner disc;
   d. means axially supporting said end of said axial extending member of said rod to said side of said configured means; and,
   e. means securing configured means to a rear of said spreader whereby said vanes are adjustable by said rods subsequently secured in position by said engaging means into said holes on said geometrical arcs for directing dry material to said conical spinner of said spinner drive, thereby optimizing and equalizing distribution pattern of said dry material.

2. Chute of claim 1 wherein said configured means comprises a substantially longitudinal U-shaped member.

3. Chute of claim 1 wherein said handle includes a horizontal outward bend towards the handle end and a small U-shaped member joining said horizontal portion to said vertical portion.

4. Chute of claim 1 wherein said vane is a substantially longitudinal member and affixed at one end to said vertical axial member.

5. Chute of claim 1 wherein said plurality of holes on each of said geometrical arcs comprises substantially nine.

6. Chute of claim 1 wherein said vanes are retarded at 4.7° with respect to the center of said conical spinner of said spinner disc.

7. Chute of claim 1 wherein said vanes are positioned in the range of 15° retarded to 15° advanced of said conical spinner of said spinner disc.

8. Chute of claim 1 wherein said dry material is fertilizer.

9. Chute of claim 1 wherein said dry material is salt.

10. Adjustable vane rear chute comprising:
   a. U-shaped member including a base, left side and right side, two opposing holes in said base for supporting an axial member, and two pluralities of holes positioned in a rearward portion of the base and aligned on opposing geometrical arcs;
   b. two geometrically configured handle rod, each rod having an axial member extending up through each of said opposing holes and including a pin for engaging into one of said holes of said geometrical arc;
   c. longitudinal vanes for securing to said axial member of said rod and positioning at an angle with respect to an end of said chute for directing material coming down therefrom to a precise position over a conical spinner of a spinner disc;
   d. ears fastening said end of said axial extending member of said rod to said side of said U-shaped member; and,
   e. tabs secured to said side of said U-shaped member for bolting to a rear of said spreader whereby said vanes are adjustable by said rods secured in position by said pins engaging into said holes on said geometrical arcs for directing dry material to said conical spinner of said spinner drive, thereby optimizing and equalizing distribution pattern of said dry material.

* * * * *